United States Patent
Kohen

(10) Patent No.: US 7,192,303 B2
(45) Date of Patent: Mar. 20, 2007

(54) QUICK CONNECT DEVICE FOR ELECTRICAL FIXTURES

(76) Inventor: Ran Kohen, 3045 NE. 208 St., Aventura, FL (US) 33180

( * ) Notice: Subject to any disclaimer, the term of this patent is extended or adjusted under 35 U.S.C. 154(b) by 118 days.

(21) Appl. No.: 11/003,570

(22) Filed: Dec. 2, 2004

(65) Prior Publication Data

US 2005/0148241 A1 Jul. 7, 2005

Related U.S. Application Data

(63) Continuation-in-part of application No. 09/787,109, filed on May 31, 2001, now abandoned, and a continuation-in-part of application No. 10/021,568, filed on Dec. 12, 2001, now Pat. No. 6,692,498.

(51) Int. Cl.
*H01R 39/00* (2006.01)
(52) U.S. Cl. ............. 439/537; 439/224; 439/441; 439/21; 439/953; 439/135
(58) Field of Classification Search ............. 439/537, 439/313, 334, 21, 675, 441, 953, 135, 22, 439/27, 224; 248/343; 362/147, 404, 657–659
See application file for complete search history.

(56) References Cited

U.S. PATENT DOCUMENTS

| | | | |
|---|---|---|---|
| 484,911 A * | 10/1892 | Green | 439/271 |
| 1,595,972 A * | 8/1926 | De Reamer | 439/313 |
| 2,077,587 A * | 4/1937 | Rowe | 200/254 |
| 2,308,016 A * | 1/1943 | Mihalyi | 439/157 |
| 2,313,481 A | 3/1943 | Rendano | |
| 2,673,966 A | 3/1954 | Larkin | |
| 2,726,372 A | 12/1955 | Appleton | |
| 2,863,037 A | 12/1958 | Johnstone | |
| 3,118,713 A | 1/1964 | Ellis | |
| 3,386,071 A * | 5/1968 | Allen | 439/135 |
| 3,398,260 A | 8/1968 | Martens | |
| 3,521,216 A | 7/1970 | Tolegian | |
| 3,585,564 A | 6/1971 | Skjervoll | |
| 3,668,603 A * | 6/1972 | Burgess et al. | 439/101 |
| 3,798,584 A | 3/1974 | Person | |
| 3,808,577 A | 4/1974 | Matheuser | |

(Continued)

FOREIGN PATENT DOCUMENTS

CA 126246 9/1998

(Continued)

*Primary Examiner*—Neil Abrams
(74) *Attorney, Agent, or Firm*—Martin Fleit; Paul D. Bianco; Fleit Kain Gibbons Gutman Bongini & Bianco, P.L.

(57) ABSTRACT

A device for connecting and supporting electrical fixtures includes a male electrical plug, a mating female electrical socket and a releasable latch assembly for both holding the plug in the socket and mechanically mounting the fixture on a supporting surface or an electrical box. The plug is provided with concentric, ring shaped male connectors that are matingly received within similarly shaped female recesses in the socket to allow the fixture to be rotated to any of a plurality or mounting orientations. The releasable latch assembly is controlled by the stroke of a simple push rod operated by a user's thumb or finger. A cover may be used for covering the socket when a plug is not installed.

39 Claims, 13 Drawing Sheets

U.S. PATENT DOCUMENTS

| | | | |
|---|---|---|---|
| 4,059,327 A * | 11/1977 | Vann | 439/535 |
| 4,083,619 A * | 4/1978 | McCormick et al. | 439/310 |
| 4,133,594 A * | 1/1979 | Laverick et al. | 439/439 |
| 4,335,927 A | 6/1982 | Allen et al. | |
| 4,448,388 A * | 5/1984 | Dennis et al. | 248/663 |
| 4,473,869 A * | 9/1984 | De Widt | 362/655 |
| 4,588,248 A * | 5/1986 | Moore | 439/272 |
| 4,753,600 A | 6/1988 | William | |
| 5,003,128 A * | 3/1991 | Grondin | 174/67 |
| 5,034,869 A * | 7/1991 | Choi | 362/363 |
| 5,173,053 A | 12/1992 | Swanson et al. | |
| 5,352,122 A | 10/1994 | Speyer et al. | |
| 5,551,882 A | 9/1996 | Whiteman, Jr. et al. | |
| 6,068,490 A | 5/2000 | Salzberg | |
| 6,241,559 B1 | 6/2001 | Taylor | |
| 7,052,301 B2 * | 5/2006 | Garcia et al. | 439/336 |

FOREIGN PATENT DOCUMENTS

| | | |
|---|---|---|
| WO | WO 00/16442 | 3/2000 |

* cited by examiner

QUICK CONNECT DEVICE FOR ELECTRICAL FIXTURES

RELATED APPLICATIONS

This application is a continuation in part of applications Ser. No. 09/787,109, filed May 31, 2001, now abandoned, and Ser. No. 10/021,568 filed Dec. 12, 2001, which issued as U.S. Pat. No. 6,962,498 on Nov. 8, 2005.

TECHNICAL FIELD

The present invention broadly relates to electrical connectors and fixtures, and deals more particularly with an electrical plug and socket combination allowing quick connection and mounting of electrical fixtures at electrical outlets.

BACKGROUND ART

Traditional techniques for installing electrical fixtures and appliances such as lighting fixtures and fans on walls or ceilings usually require the assistance of a qualified electrician, and the use of a variety of tools and specialized hardware. The procedure for installing or uninstalling such fixtures can also be relatively time consuming, even when formed by experienced installer. In addition to the need for hand-wiring the necessary electrical connections between the fixture and electrical power supply wiring, the installer must make separate mechanical connections for supporting or suspending the fixture in place.

One solution to the problem is disclosed in PCT Application No. PCT/IL99/00499 ("PCT '499"), assigned to the assignee of the present application. PCT '499 discloses a plug and socket combination that permits quick connection of an electrical fixture or appliance at an electrical junction box on a wall or ceiling. The socket is secured on the wall or ceiling near electrical power supply wiring and includes a pair of hollow, female receptacles which receive male electrical prongs carried on the plug. The electrical fixture is secured to the plug. In addition to the quick electrical connection provided by this plug and socket combination, a mechanical connection between the plug and socket carries the mechanical load of the electrical fixture. This solution was less than completely desirable however, because the use the use of two male prongs and corresponding female receptacles prevented the installer from rotating the electrical fixture to a desired orientation.

An improvement to the plug and socket described above is disclosed in PCT Application No. PCT/IL01/01078 ("PCT '078"), also assigned to the assignee of the present application. The plug and socket combination shown in PCT '078 employs arcuately shaped electrical interconnections in the form of ring shaped male plug elements received within correspondingly shaped female receptacle openings. By this arrangement, the plug, along with the electrical fixture to which it is attached, can be freely rotated by the installer to a desire rotational position. However, although the plug and socket shown in PCT '078 can be freely rotated, a problem existed in some applications where it was desirable or necessary to secure the fixture in a fixed position once the fixture was rotated into the desired orientation.

A still further improvement in the art is shown in Israeli Patent Application No. 159032 filed Nov. 24, 2003, assigned to the assignee of the present application. In this Israeli application, a revolvable plug and socket combination is disclosed which includes means for selectively locking the plug and socket against relative rotation. By this feature, a user may lock the fixture against further rotation once the installer has indexed it to a desired orientation.

While each of the quick connect plug and socket combinations described above is quite useful in certain specific applications, further improvements would be desirable in order to provide a universal device that can be used in a wider range of applications and gain widespread acceptance, while satisfying local and national building codes and standards. The present invention is intended to satisfy this need in the art.

SUMMARY OF THE INVENTION

According to one aspect of the invention, a device is provided for quickly connecting an electrical fixture with electrical power supply wiring, and for mounting the fixture on a support. The device includes a socket including a socket body having at least one internal cavity therein; an electrically conductive contact terminal disposed within the cavity for establishing an electrical connection between the electrical power supply wiring and the socket, the contact terminal having a portion thereof captured between internal surfaces of the socket body to hold the contact terminal in a fixed position without the need for fasteners; a plug rigidly fixed to the fixture and insertable into the socket, the plug having at least one male connector electrically connected to the fixture and engageable with the contact terminal within the socket to establish a circuit between the electrical fixture and the electrical power wiring; and, a releasable latch carried on the combination of the plug and the socket for releasably mounting the fixture on the support. The elimination of fasteners to hold the contact terminal in place not only reduces the cost of the device but also speeds manufacturing and assembly of the device.

According to another aspect of the device, compression springs are mounted within the socket cavities to supplement the spring force of the contact terminals, thus assuring reliable connection between the contact terminals and male connectors within the plug.

According to still another aspect of the invention, wire access holes are provided in both the top and the sides of the socket, thus giving the installer a choice of either top feed or side feed of the electrical supply wires into the socket. The contact terminals are configured to provide a similar choice of top or side feed, allowing the device to be installed in a wide range of applications.

According to a further aspect of the invention, a cover may be installed in the socket, overlying the wall or ceiling area around the device to provide a more please esthetic appearance when a fixture has not yet been installed.

In those installations where it is not possible to gain direct access to the centrally located latch, a lateral actuator assembly is provided for controlling the latch.

Accordingly, it is a primary object of the present invention to provide a device that facilitates quick electrical and mechanical connections between an electrical fixture and an electrical outlet on a wall, ceiling or floor.

Another object of the invention is to provide a device of the type mentioned above that can be used by unskilled or inexperienced users to quickly and easily install electrical fixtures.

A further object of the invention is to provide a device as described above which permits the electrical fixture to be rotated into a desired position during or after installation, and then locked in place.

Another object of the invention is to provide a device of the type mentioned which is suitable for universal use in a complete range of applications and environments, and which meets existing building codes and national electrical standards.

A still further object of the invention is to provide a device of the type referred to above which allows a user to install or remove an electrical fixture from an electrical supply box without the need of special tools or the assistance of a trained electrician and to do so easily and quickly.

Another object of the invention is to provide a device as described which is capable of connecting a wide variety of electrical appliance and fixture configurations to various types of wall, ceiling or floor outlets, electrical junction boxes or even flat wall surfaces that are not provided with electrical outlets.

A still further object of the invention is to provide a device as described above which possesses a minimum number of parts, avoids the use of fasteners where possible and can be manufactured in high volume using automated production techniques.

These, and further features and advantages of the present invention will be made clear or will become apparent during the course of a description of a preferred embodiment of the invention.

BRIEF DESCRIPTION OF THE DRAWINGS

In the drawings, which form an integral part of the specification and are to be read in conjunction therewith, and in which like reference numerals employed to designate identical components in the various views.

DETAILED DESCRIPTION OF THE PREFERRED EMBODIMENT

Figure 1:
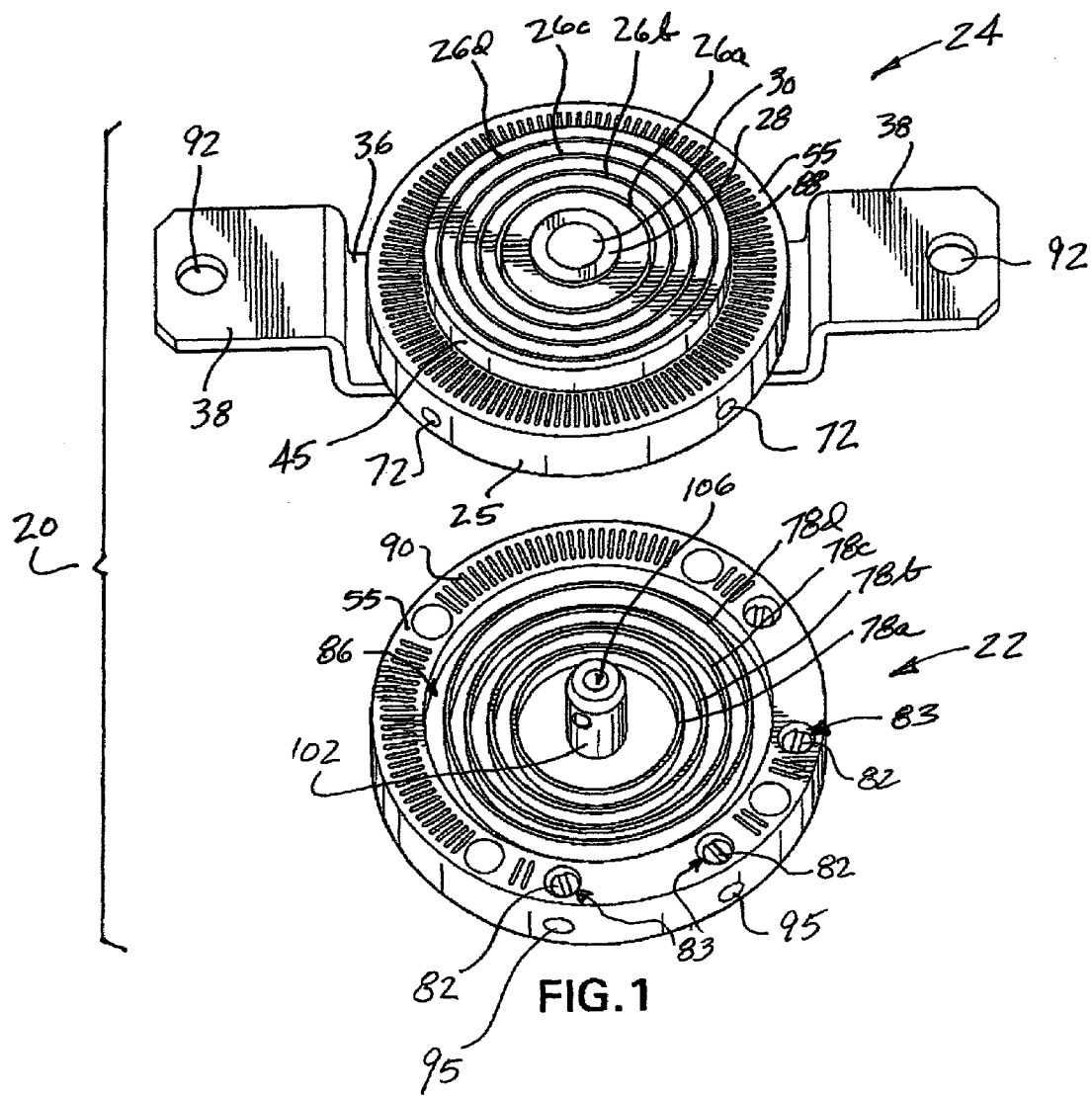
FIG. 1 is a perspective view of a quick connect device for electrical fixtures which forms the preferred embodiment of the present invention, the plug being shown separated from the socket.

Referring first to FIGS. 1–4, a quick connect device 20 for installing electrical fixtures comprises the combination of a plug 22 and mating socket 24. The device 20 functions to both establish an electrical connection between an electrical fixture and electrical supply wiring, and mechanically support the fixture on a surface or base, typically a wall, ceiling or floor surface. As used herein, the term "fixture" or "electrical fixture" means any fixture or appliance such as a lighting fixture, ceiling fan, television camera, security device or any other device which is powered by electricity supplied by electrical wiring, and which requires a mechanical connection to support or suspend the fixture. Plug 22 is fixedly secured to an electrical fixture (not shown), while the socket 24 is secured to either the surface (e.g., wall, ceiling or floor) on which the fixture is to be mounted, or to an electrical junction box.

The socket 24 comprises a cylindrically shaped, essentially hollow body 25 having a flat circular cover 66, both formed of non-conductive material such as phenolic resin. Four concentric, ring shaped, female recesses or slots 26a, 26b, 26c, 26d are formed in one face of the socket 24, and are configured to matingly receive four, later discussed male connector rings on the plug 22 to establish electrical connections between the plug 22 and the socket 24. The socket 24 includes a center through hole within which there is fixedly secured a metal bushing 28. The bushing 28 is provided with two concentric bores 30, 32 of differing diameters to define a circumferentially extending shoulder 34. In the illustrated embodiment, bushing 28 passes through and is fixedly secured to an elongate mounting strap 36 as by welding. It should be noted here however, that the bushing 28 and the strap 36 could be of unitary construction, formed of a single piece of high strength material, such as metal as by casting, machining or other metal working processes.

Figure 2:
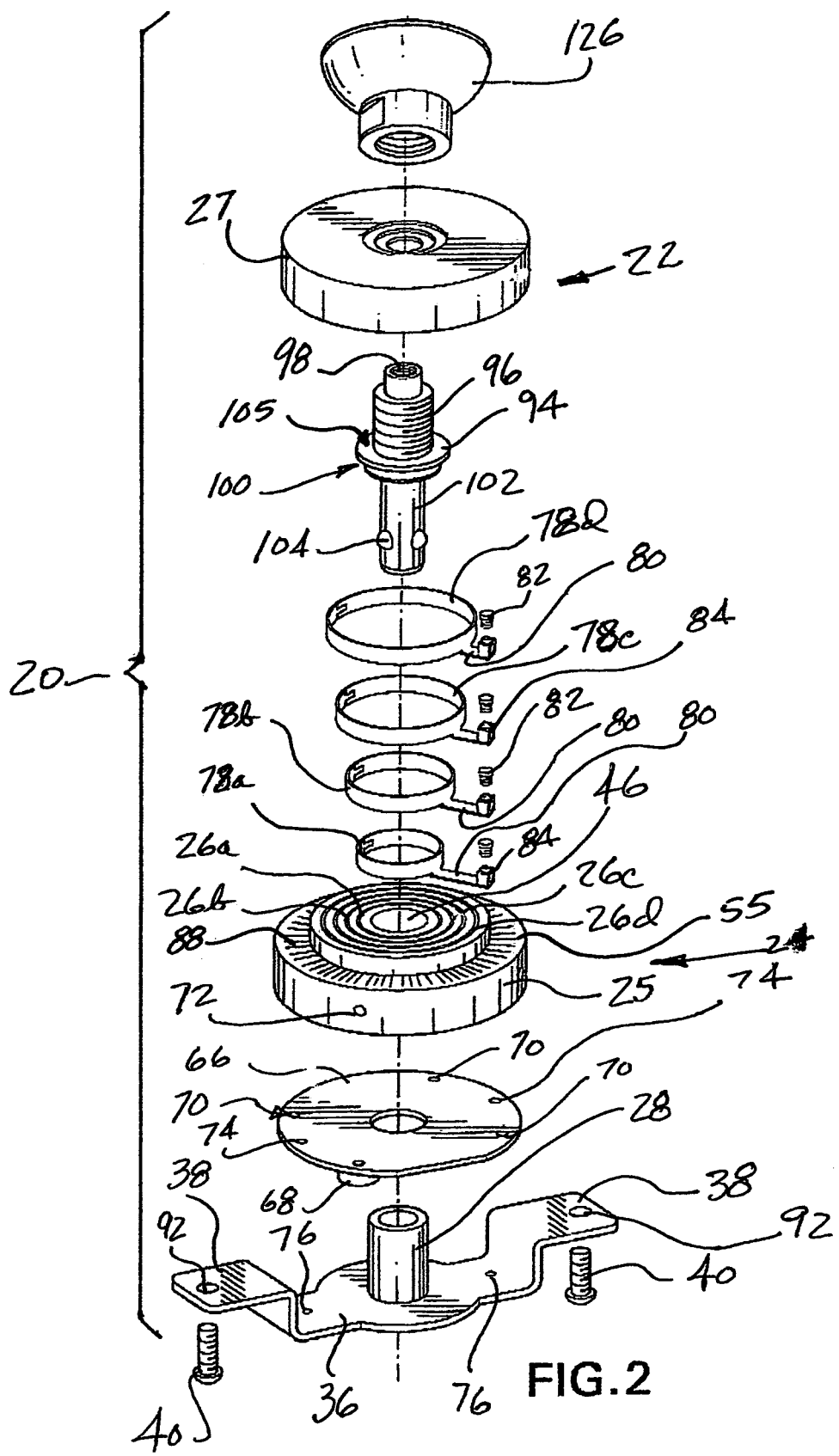
FIG. 2 is an exploded, perspective view of the device shown in FIG. 1.

As best seen in FIGS. 1 and 2, mounting strap 36 is generally U-shaped and is provided with an aperture 92 on each of its outer extremities or flanges 38 which receives a screw 40 to mount the strap 36, and thus the entire device 20, on a suitable mounting surface. In the illustrated embodiment, the spacing between the apertures 92 is selected so that the strap 36 can be affixed to a common electrical junction box (not shown) formed of metal and having threaded holes into which the screws 40 may be driven. The U-shaped configuration of the strap 36 allows the socket 24 to be recessed within the junction box (see FIG. 10). However, in those applications where it is necessary to mount the socket 24 directly on a wall or ceiling without use of a junction box, a flat strap may be employed (see FIG. 7). In the illustrated example, the socket 24 is secured to the strap 36 by means of screws (now shown) passing through openings 76 and the strap 36, into the cover 66. However, other techniques may be used to secure the socket body to the combination of the strap 36 and bushing 28. For example, the top of the cover 66 could be provided with nipples that extend through the strap openings 76 and are deformed, as by melting to rigidly fix the strap 36 to the top of the cover 66. Alternatively, the bushing 28 could be provided with laterally extending surface features that are integrally molded into the body 25 of the socket 24.

The cover 66 is received within a ring shaped recess in one face of the socket 24 and may be affixed to the body 25 of the socket 24 by any suitable means such as, for example, ultrasonic welding. The cover 66 is provided with four upstanding bosses 68 circumferentially spaced around its periphery. Each of the bosses 68 includes a tapered access opening 70 communicating with the hollow interior of the socket 24. A second set of four access openings 72 are provided in the outer wall of the socket body 25.

Figure 3:
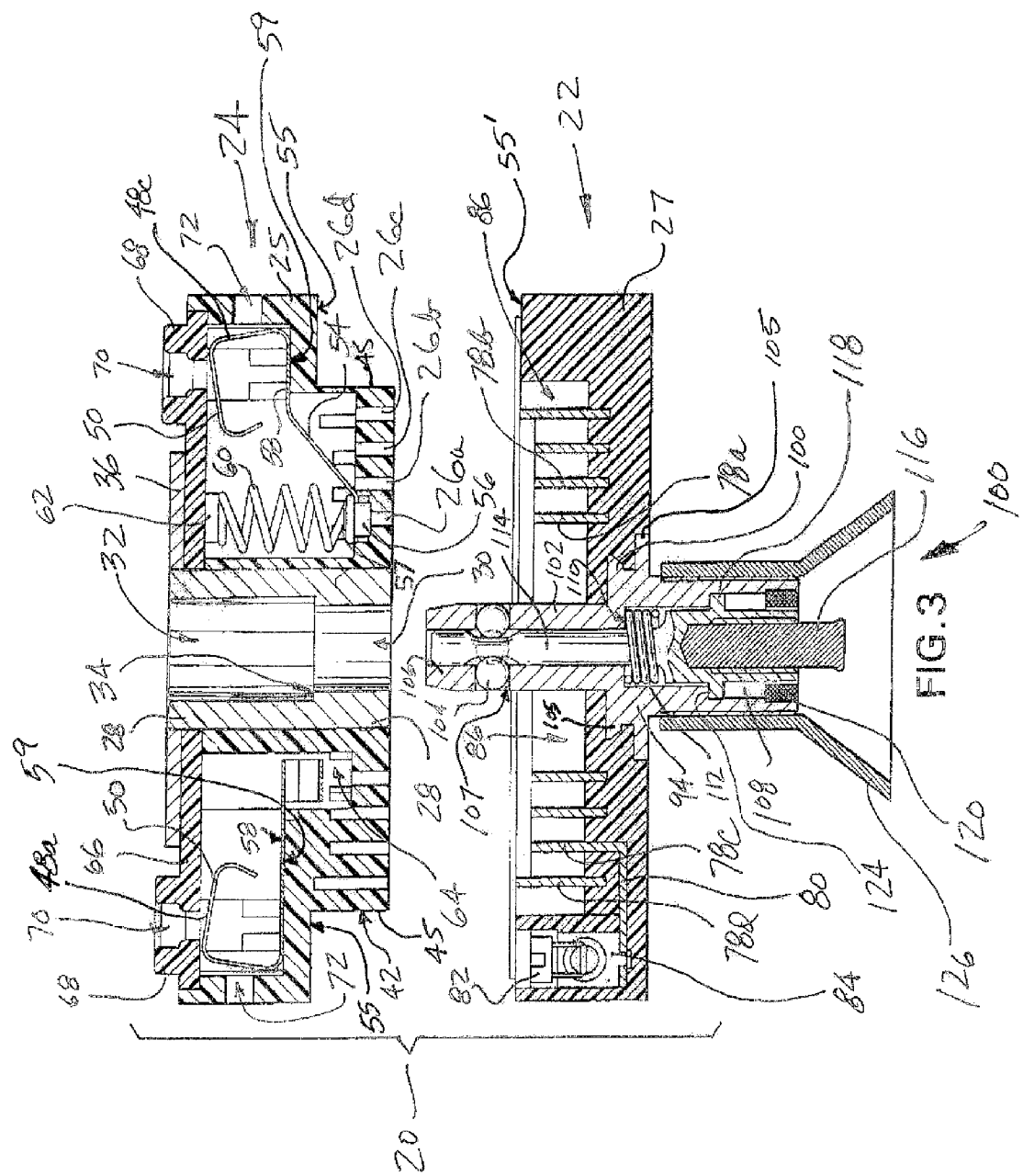
FIG. 3 is a medial cross sectional view of the device shown in FIG. 1 taken along line 3—3 of FIG. 12, also depicting the plug separated from the socket.
Figure 4:
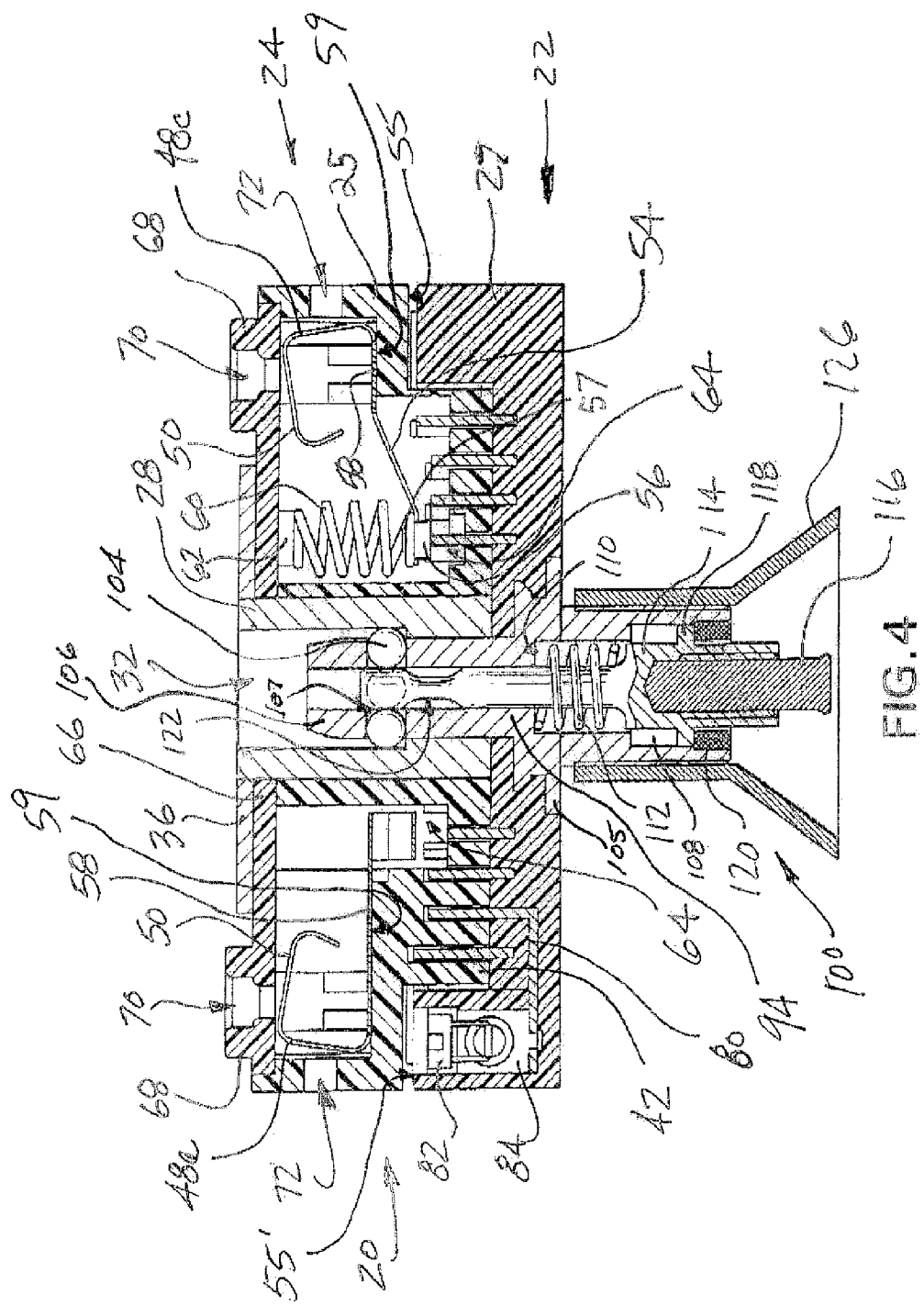
FIG. 4 is a view similar to FIG. 3 but showing the plug installed within the socket.

As best seen in FIGS. 3 and 4, the female slots or recesses 26a–26d extend axially into the socket body and each communicates with a contact opening 64 at a location around the circumference of the slot or recess. In the illustrated embodiment, slots or recesses 26a–26c are of essentially equal depth, while recess 26d is of a greater depth for purposes which will become later apparent. The socket body 25 is provided with circumferential notch 42 defining an annular face 55 that is intended to engage a later discussed, corresponding face on the plug body 27 and acts as a stop to limit the entry of the plug 22 into the socket 24. Annular faces 55 and 55' are provided with a plurality of circumferentially spaced, radial extending indexing teeth 88, preferably integrally molded into the socket and plug bodies 25 and 27 that interengage or mesh to provide a ratchet effect when the plug is not firmly seated in the socket thereby enabling rotation for positioning.

Figure 6:
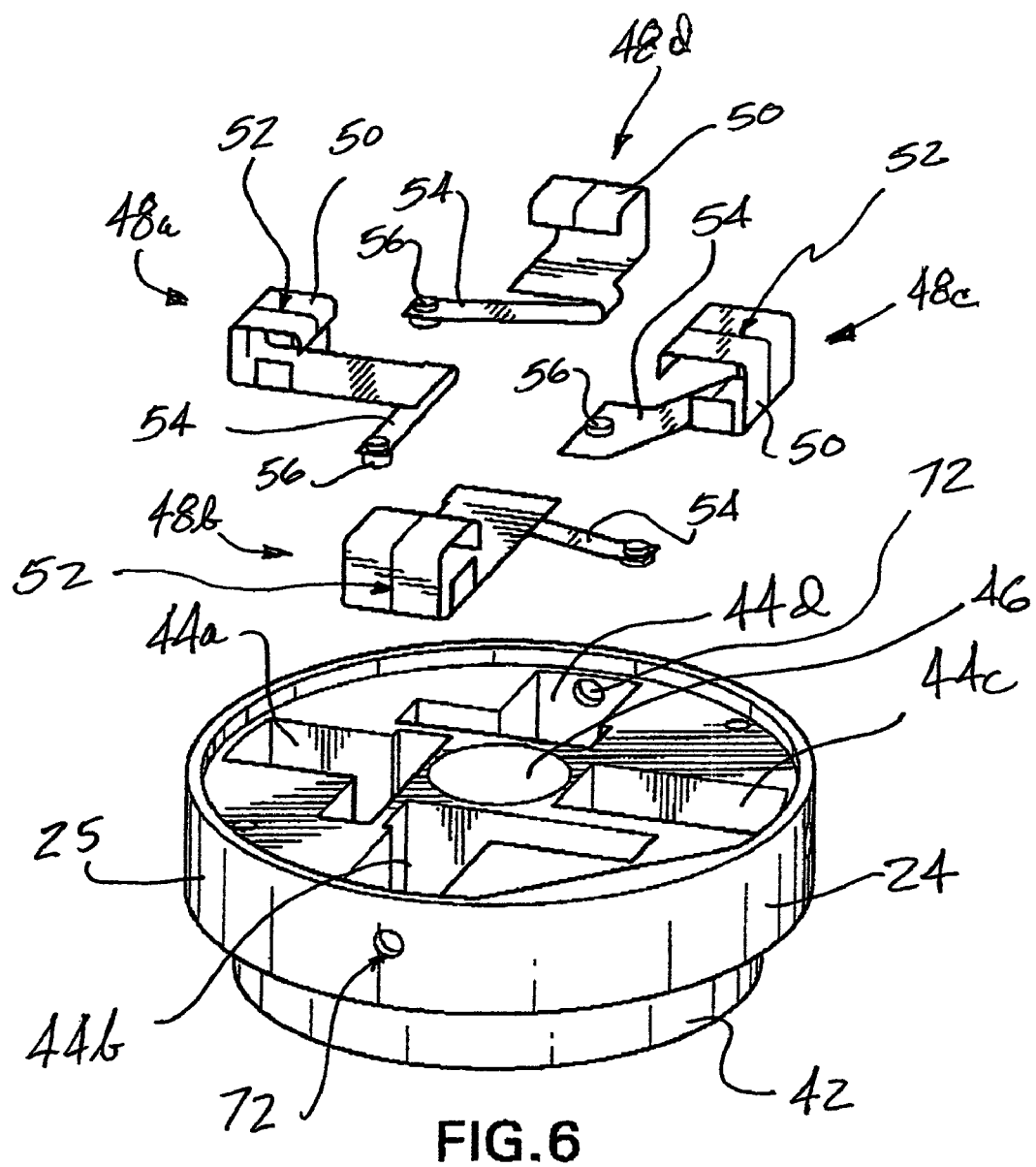
FIG. 6 is an exploded, perspective view of the socket, depicting the relative positions of the electrical contact terminals.
Figure 12:
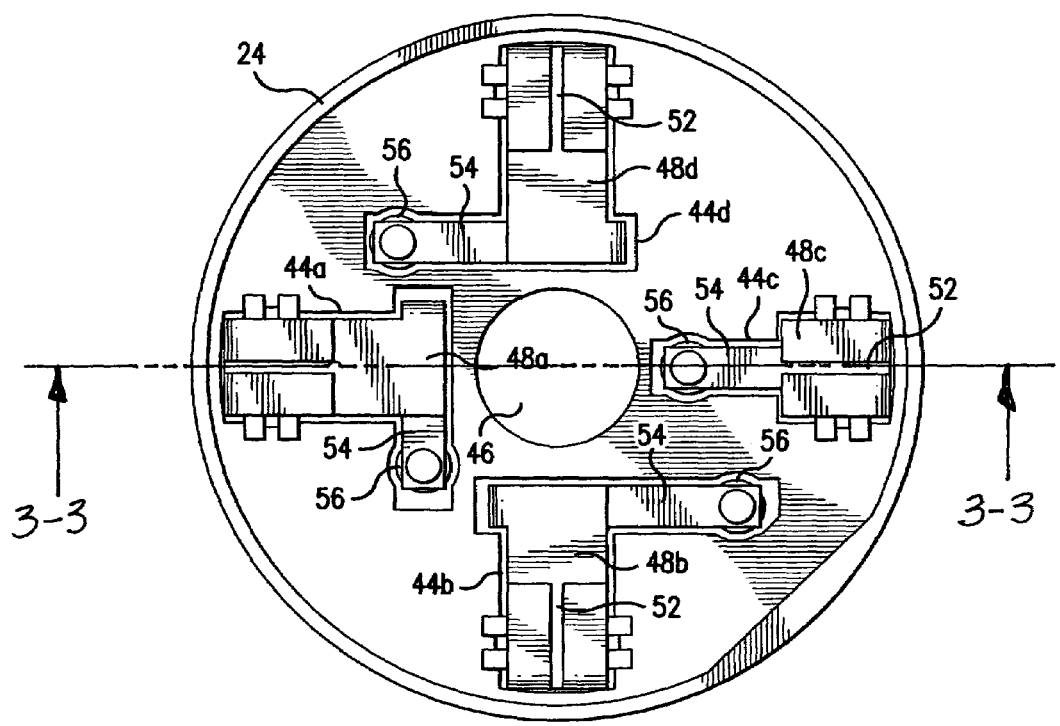
FIG. 12 is a plan view of the top of the socket, the socket cover having been removed to reveal details of the contact terminals.

Referring now also to FIGS. 6 and 12, the socket body 25 includes four circumferentially spaced cavities 44a–44d therein (see FIG. 6) within which there are respectively disposed four electrical contact terminals 48a–48d. Contact terminals 48a–48d are preferably formed from electrically conductive, spring beryllium copper or steel using precision stamping techniques to produce the individual features of the terminal. Each of the terminals 48a–48d includes a flat intermediate section 58 which rests on a ledge 59 formed within the associated cavity 44a–44d. An upper extremity 50 of the terminals 48a–48d includes a split bent leg or pair of bent legs side by side and include centering lugs 65 on each side which respectively contact an inner wall of the body of the plug 24 and the bottom face of the cover 66. By this series of contact points between the terminals 48a–48d and the inside surfaces of the socket 25 and cover 66, the terminals 48a–48d are tightly captured within the cavities 44a–44d, respectively aligned with an associated slot or recess 26a–d, and are electrically insulated from each other. In FIG. 12, two spaced centering lugs 67 are provided on each side, for better insertion of a wire into the extremity 50.

The lower extremity of each of the contact terminals 48a–48d includes a spring leg 54 which extends downwardly into a corresponding one of the contact openings 64. Each of the spring legs 54 is flexible about its upper end which is connected by a bend to the intermediate section 58. The lower end of each of the spring legs 54 is provided with an electrical contact member 56 which overlies and is in radial registration with a corresponding one of the recesses 26ab–26d, as best seen in FIGS. 3 and 4. Contacts 56 each include a cylindrical boss 57 on their upper end which is received within and functions to retain a compression spring 60 whose upper end is held in place against the cover 66 by a retainer 62 affixed to the bottom side of the cover 66. Compression springs 60 supplement the spring force provided by spring legs 54 to urge the electrical contacts 56 downwardly into the contact openings 64, adjacent the corresponding recesses 26a–26d.

Each of the contact terminals 48a–48d is provided with a split or narrow gap or slot 52 which extends through the length of angularly offset top and sides of the upper extremity of each terminal 48a–48d. The width of each of the slots 52 is selected so as to be substantially less (close to zero) than the diameter of the electrical connecting wire which delivers power to the socket 24. Thus, the exact width of the slots 52 will depend on the gauge of the electrical wiring in a given application. The bare, stripped end of the electrical supply wire is connected to the socket 24 by inserting the wire end into one of the tapered access openings 70 and forcing the end of the wire through or into the slot 52 wherein the bifurcated parts of the terminal provide a spring pressure against the inserted wire and thereby tightly grip the wire. Because the slot 52 extends completely to the end of the upper extremity of the terminal 48a–48d, the sides of the upper portion of the terminal yields to the entering supply wire, causing slot 52 to expand which both accommodates the passage of the supply wire and captures it under spring pressure, thereby making a reliable electrical connection.

In some applications, it may not be convenient or possible to feed the electrical supply wires through the top face of the socket body 25. In this case, the electrical supply wires may be trained through access openings 72 in the side wall of the socket body 25, where again they are forced through the corresponding slot 52 in order to establish electrical connection to the socket 24.

Referring now particularly to FIGS. 1–4, the plug 22 includes a body 27 formed out of non-conductive material, which can be identical to the material used to form the socket body 25, and includes a cylindrical cavity 86 in one face thereof. Four concentric, male connector rings 78a–78d are integrally molded into the plug body 27, with sufficient radial spacing therebetween to electrically insulate them from each other. The diameters and spacing of the male connector rings 78a–78d are such that they are alignable with and receivable within the corresponding female recesses 26a–26d in the socket 24. Each of the connector rings 78a–78d includes an integrally formed lateral extension 80 which ends in a terminal block 84. The terminal blocks 84 are circumferentially spaced from each other so as to lie along a circle, near the out periphery of the plug body 27. The plug body 27 is provided with four, spaced-apart, lateral wire openings 95 therein which are circumferentially aligned with the connector blocks 84. Four additional, circular openings 83 are provided in the top face 55 of the plug body 27 which are circumferentially aligned with and provide access to the terminal blocks 84. Set screws 82 pass through openings 83 and are received within threaded holes in the top of the terminal blocks 84. Electrical wiring from the electrical fixture which is attached to the plug 22 is trained through the lateral wire openings 95 so that the stripped ends of the wire pass into the lateral openings in the terminal blocks 84. Set screws 82 provide a means of tightly securing the electrical wire ends on the terminal blocks 84, thereby connecting the fixture with the male connector rings 78a–78d.

The plug 22 as well as the fixture attached thereto, is mechanically connected to the socket 24 and to the and mounting strap 36 by means of a centrally located, releasable latch assembly 100 which will now be described in detail. The latch assembly 100 includes a barrel 94 having a series of coaxial bores therein, and a latch pin 114 axially slidable within the barrel 94. The barrel 94 includes a plurality of retaining balls 104 captured within radial openings in the barrel 94. The upper end 106 of latch pin 114 is provided with a reduced diameter section forming a recess or ball detent 122 into which the retaining balls 104 may be inwardly displaced. The lower end of the barrel 94 includes two axially aligned bores having successively greater diameters, so as to define a pair of annular shoulders 110, 124. A compression spring 112 is sleeved over the latch pin 114 and is captured between shoulder 110 and the bottom portion of the latch pin 114, thereby normally biasing the latch pin 114 to move downwardly (outwardly) into a latched or locking position, wherein the latch pin 114 forces retaining balls 104 outwardly until they rest against the shoulder 34 within bushing 28. Downward travel of the latch pin 114 is limited by an annular retainer 120 received within the end of the barrel 94. Latch pin 114 includes an annular flange or lateral extension 118 which slides within barrel opening 108 until it contacts the retainer 120.

In the illustrated embodiment, the latch assembly 100 is attached to the plug body 27 by means of annularly shaped, lateral extensions or flanges 105 on the barrel 102 which are integrally molded into the plug body 27. A push rod 116, which is secured to and extends from the lower end of the barrel 94, provides a means of actuating the latch assembly 100 using either a finger or a tool. A guard cover 126 is secured to the lower end of the barrel 94 and includes a splayed lower portion surrounding the end of the push rod 116. As best seen in FIG. 2, the lower end of the barrel 94 is threaded 96 so as to receive internal threads on the guard cover 126. The guard cover 126 not only protectively covers the sides of the push rod 116 in order to prevent inadvertent actuation of the latter, but acts as a guide to lead a user's finger onto the end of the push rod 116. Further, the cover 126 provides a means of gripping and holding the plug 22 during the installation process; the user places the index and middle finger fingers on the sprayed lower portion of the cover 126 while the thumb actuates the push rod. Guard cover can also be used to mount a fixture to the plug.

Figure 13:
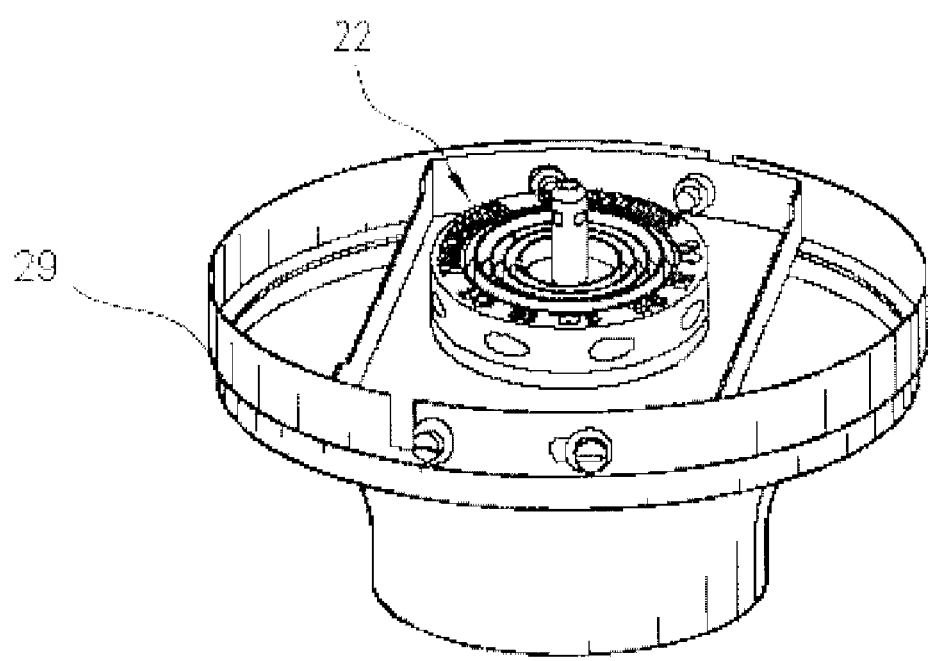
FIG. 13 is a schematic view of an exemplary electrical fixture affixed to the plug of the present invention.

Referring to FIG. 13, an electrical fixture 29 may be secured to the plug 22 in any of a variety of ways. For example, the fixture may be fixedly attached by or to the guard cover 126, or directly to the lower threaded section of the barrel 94. Alternatively, the fixture may be secured to a piece of mounting hardware, such as a "hickey" threaded onto the lower end of the barrel 94. In any event, it may be appreciated that the weight of the fixture is transmitted through the barrel 94, retaining balls 104, and bushing 28 to the mounting strap 36, which in turn is secured to the junction box, wall or other structure on which the fixture is to mounted.

Figure 5:
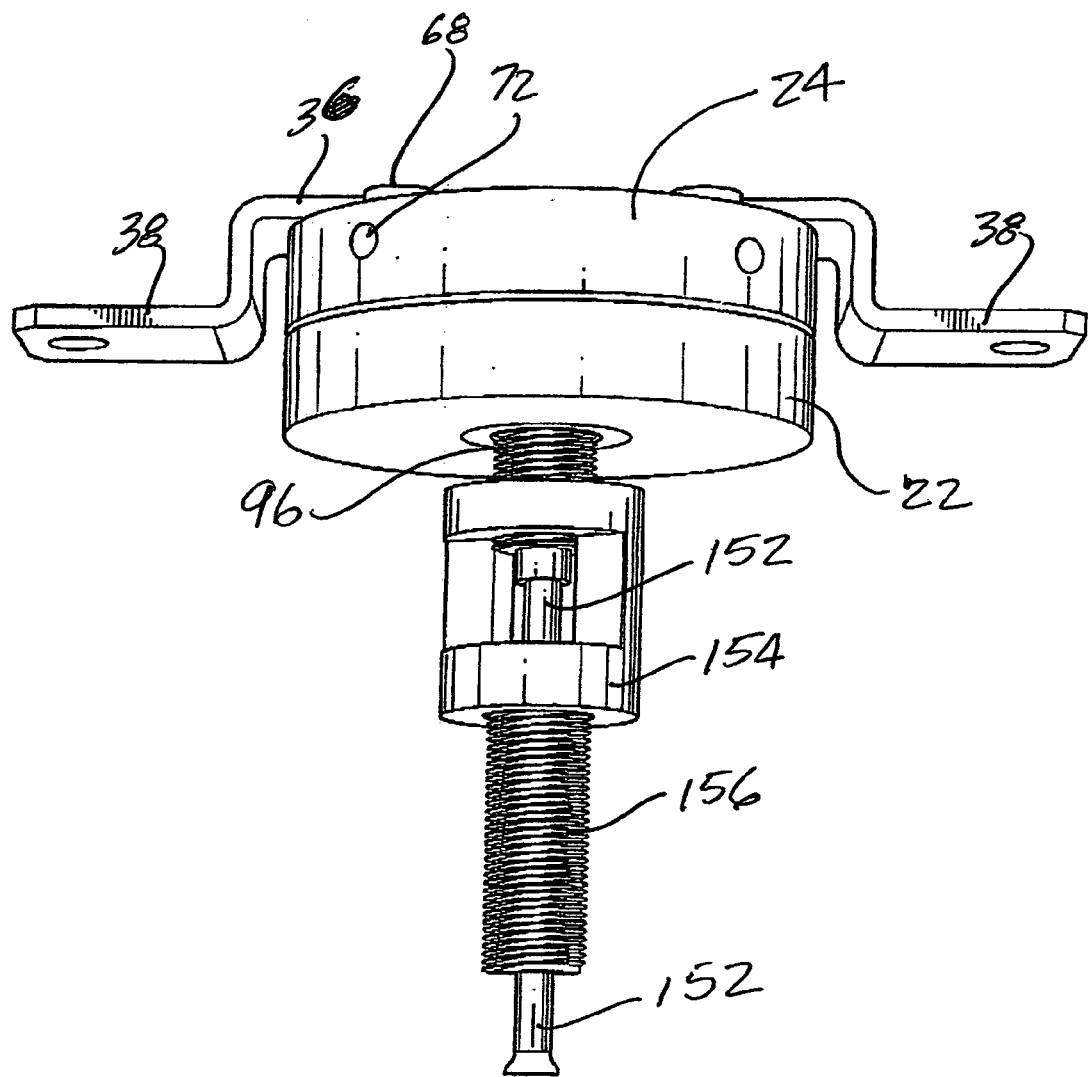
FIG. 5 is a perspective view of a modified form of the device, provided with a latch pin extension assembly useful in installing certain types of electrical fixtures.

Referring now to FIG. 5, in some installations it may be necessary to effectively extend the length of the latch assembly 100 where, for example, a motor or other parts of the electrical fixture are covered by a downwardly extending shroud or canopy (not shown). In this event, additional hardware such as a threaded hickey 154 is screwed onto the lower threaded portion 96 of the barrel 94. A threaded guide barrel 156 is in turn screwed into the lower end of the hickey 154. Either a longer push rod 152 is utilized which is attached at its upper end to the latch pin 114, or the current push rod 116 is provided with a tapped hole and push rod 152 is provided with a threaded extension for threading into the tapped hole. The push rod 152 is guided by the guide barrel 156, with its lower end 152 extending beyond the lower end of the barrel 156. The configuration shown in FIG. 5 is also advantageous in that the electrical fixture may be mechanically mounted on the hickey 154 by suitable fasteners or by welding, or on the threaded guide barrel 156.

Figure 7:
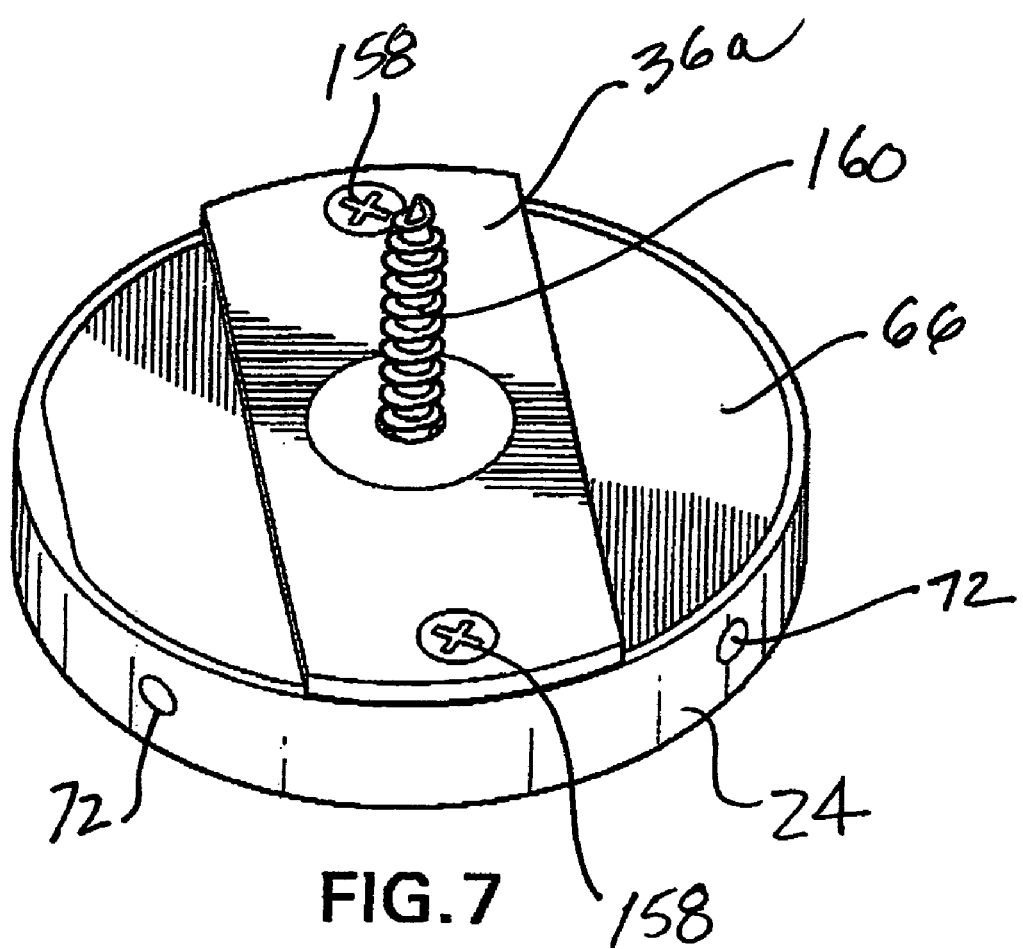
FIG. 7 is a perspective view of a modified form of the socket suitable for installation on a flat ceiling or wall.

In some installations, a recessed electrical junction box may not be available to provide the means of mechanically mounting the device 20 on a surface. In this case, as shown in FIG. 7, the socket 24 may be secured to a flat mounting surface, such as a wall or ceiling, by means of a screw or lag bolt 160 which is secured to a modified, flat mounting strap 36a. Mounting strap 36a is in turn attached to the cover 66 by means of screws 158. In this embodiment, wires (not shown) supplying electricity are trained through the access openings 72 in the side of the socket body 25. As shown in FIG. 7, the strap 36a does not extend beyond the outer periphery of the socket 24, thereby concealing the strap 36a and providing a more pleasing appearance.

Figure 8:
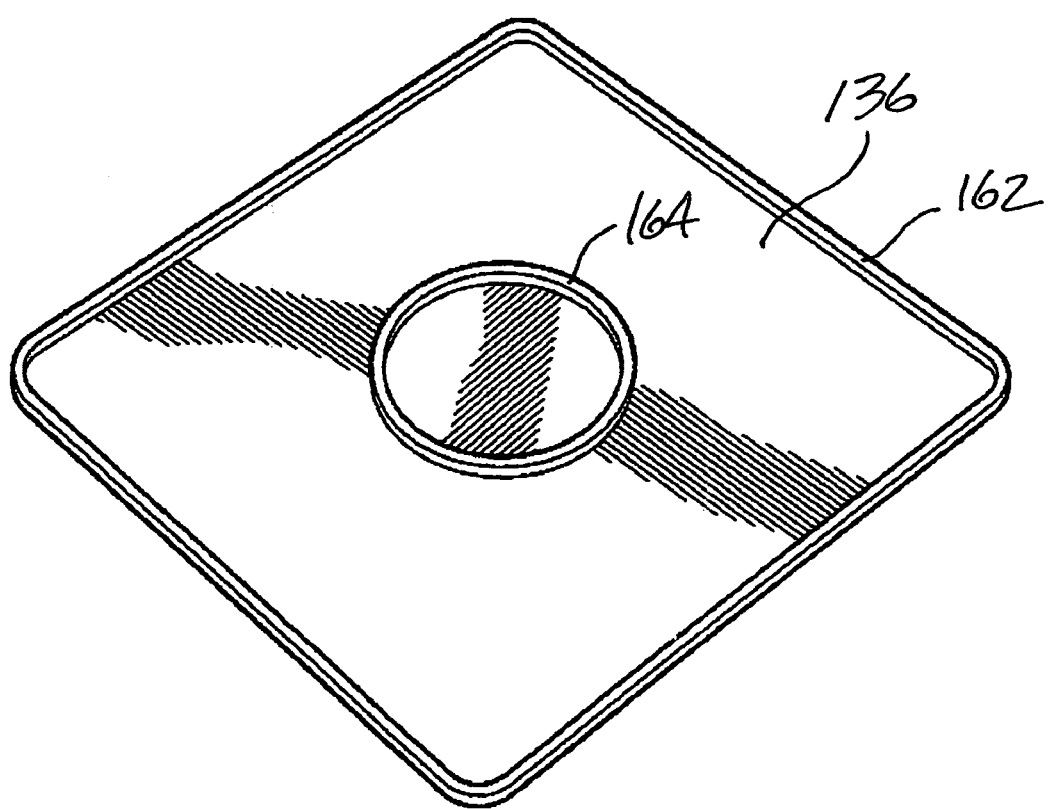
FIG. 8 is a perspective view of a blank cover suitable for covering the socket when not in use.
Figure 9:
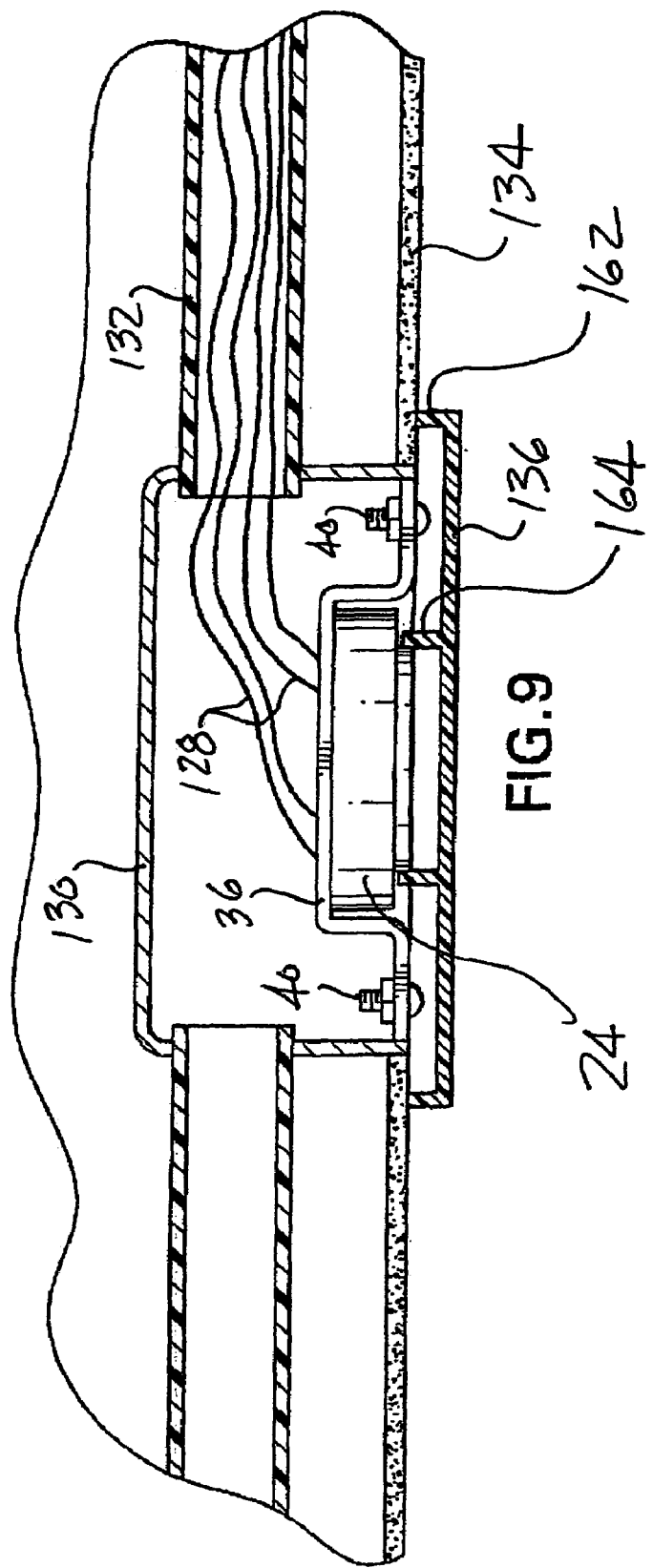
FIG. 9 is a fragmentary, medial cross-sectional view showing the cover depicted in FIG. 8 having been installed over a socket mounted in a ceiling-mounted electrical box.

FIGS. 8 and 9 depict a blank cover 136 which may be used to cover the socket 24 where a fixture has not yet been mounted on an electrical outlet. As shown in FIG. 9, an electrical junction box 130 is recessed within a ceiling or wall 134 and is connected with conduits 132 which enclose electrical wires 128 providing electricity to the socket 24. Socket 24 is secured to a metal mounting strap 36, as previously described which in turn is secured to junction box 130 by means of screws with or without nuts 40. The blank cover 136 includes an upstanding, peripheral edge 162, and a centrally located, raised mounting ring 164. The mounting ring 164 is received in tight frictional engagement over the lower cylindrical portion 45 of the socket 24. This frictional engagement is sufficient to hold the cover 136 in place, with the outer edge 162 in engagement with the wall or ceiling 134.

Figure 10:
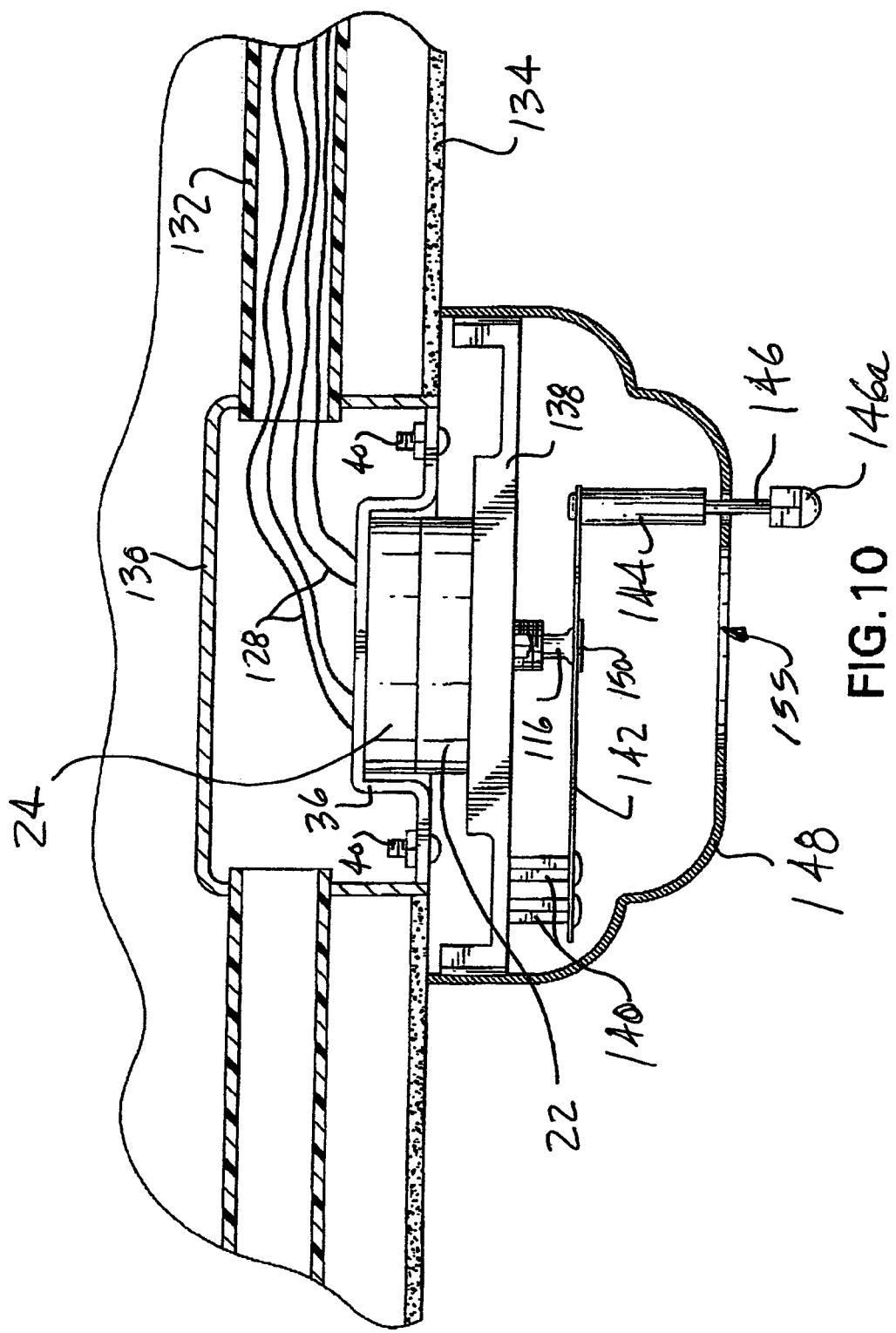
FIG. 10 is a fragmentary, partially medial sectioned view showing a modified form of the device useful for mounting certain types of electrical fixtures such as electric fans or chandeliers, and depicting the latching mechanism in its locked position.
Figure 11:
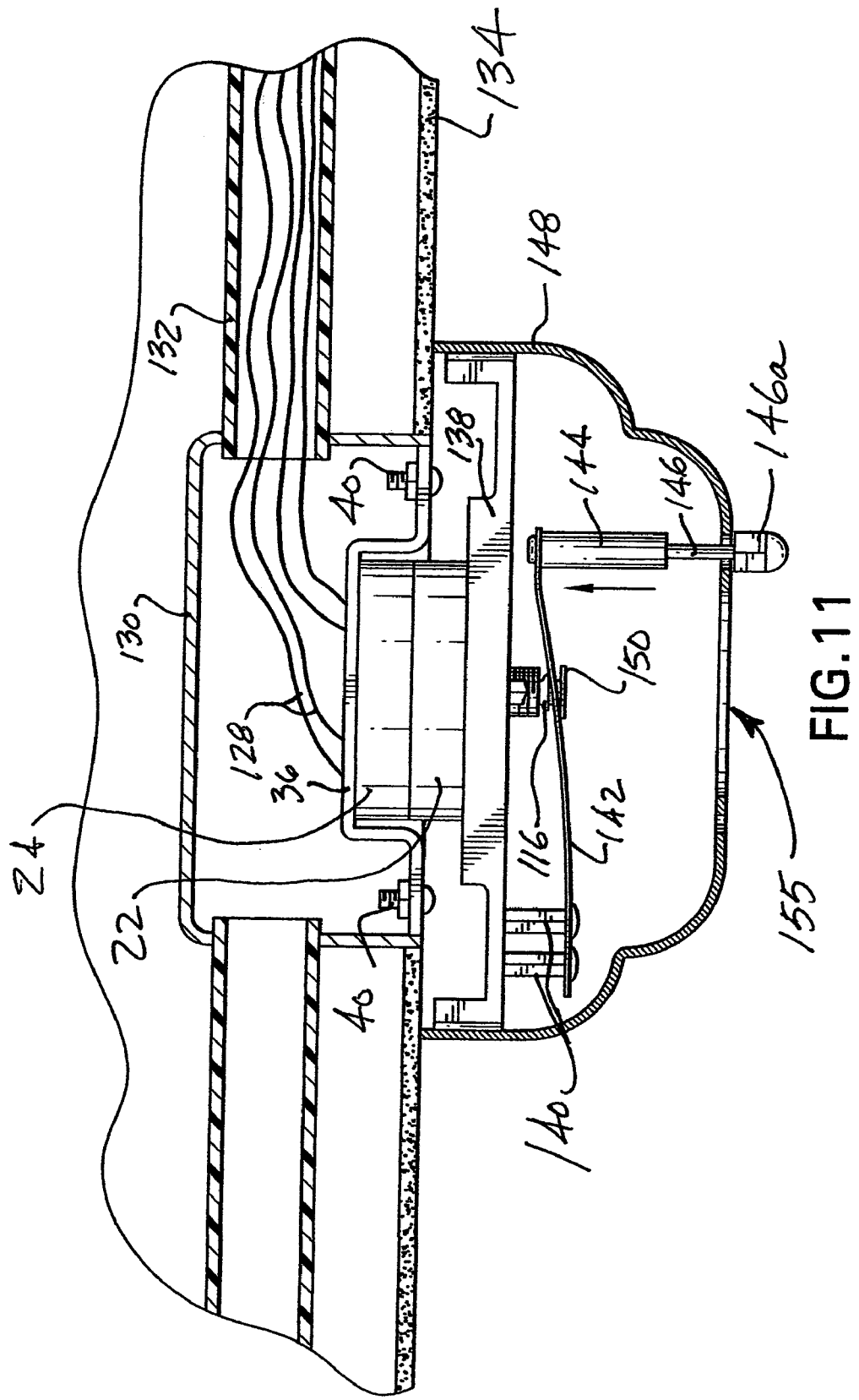
FIG. 11 is a view similar to FIG. 10 but showing the latching mechanism moved to its released position.

In some installations where the electrical fixture includes structure such as a motor, it may not be possible to gain direct access to the centrally located latch assembly 100 and push rod 116, even if the length of the latter is extended. In such installations, a modified form of the device 20 may be used, as shown in FIGS. 10 and 11. A support member 138 includes a central threaded aperture for receiving the lower threaded end 96 of barrel 94, thus securely mounting support member 138 on the junction box 130 through the mounting flange 36. Support member 138 extends laterally on each side of the central axis of the latch assembly 100 and has it outer ends engaging the sidewall of a canopy 148 which may be directly attached to the support 138.

Canopy 148, which is employed primarily for esthetic purposes, encloses the exposed box 130 as well as wiring and structure such as a motor (not shown) or other equipment forming part of the electrical fixture. A pair of mounting spacers 140 secured to the support member 138 extend downwardly from the latter and have secured thereto one end of a flexible lever 142 formed, for example, of spring steel, synthetic material or other spring-like material, and constitutes a flat leaf spring which returns to its original shape after deflection. Medial portions of the lever 142 are secured to the push rod 116 by a retainer 150, which can simply be the top portion of rod 116. The opposite end of the lever 142 has an extension rod 144 secured thereto which includes a downwardly extending reduced diameter section 146 passing through an opening in the canopy 148 and having a knob 146a on its free lower end.

With rod 144 in its normal, down position shown in FIG. 10, the latch assembly 100 is locked, securing the plug 22 in the socket 24 and forming a mechanical connection that supports the weight of the fixture on the mounting strap 36. Although not specifically shown in the drawings, mechanical structure such as a fan motor is mounted inside a canopy 148, directly beneath the push rod 116, and extends downwardly through an opening 155 in the canopy 148.

In order to release the plug 22 from the socket 24 and disengage the mechanical connection supporting the fixture, the user moves rod 144 upwardly, causing lever 142 to deflect, which in turn displaces the push rod 116 upwardly. This upward movement of the push rod 116 also displaces the latch pin 114 upwardly, allowing the retaining balls 104 to move into the depressions 122, thus releasing the latch 100 and allowing the barrel 94 to be removed from the bushing 28.

Having described details of the preferred embodiment of the device 20, and various modifications thereto, the use and operation of the device 20 will now be explained. The socket 24 is first installed either on an electrical junction box 130 or directly on a wall or ceiling surface. The installer then connects electrical supply wires 128 to the socket 24 by passing the bare ends of the wires into either wire openings 70 or 72, depending how the socket 24 is mounted. The wire ends are then forced into the slots 52 in the contact terminals 48a–48d which securely retain the wires within the socket 24 and establish an electrical connection between the electrical supply wires and the electrical contact members 56.

The electrical fixture to be installed is first mounted on the plug 22. As previously discussed, the exact mounting method will vary, depending on the type, size and configuration of the fixture. Wiring from the fixture is routed through the lateral wire openings 95 in the side of the plug body 27, and fed into the lateral openings in the terminal blocks 84. The set screws 82 are then screwed down onto the wire ends to secure the latter in place.

Having secured the fixture to the plug 22, the installer first depresses the push rod 116 to displace the latch pin 114 until the depressions 122 align with the balls 114. The balls 104 move into the depressions 122, allowing the upper cylindrical section 106 of the barrel 94 to pass into the bore 30. As the insertion process continues, the male connector rings 78a–78d enter and move through the respectively associated female socket recesses 26a–26d until they engage the respectively associated contact members 56, thereby establishing electrical connection between the fixture and the contact terminals 48a–48d. The springs 60 hold contacts 56 firmly against the rings 78a–78d to assure a continuous, reliable electrical connection. At this point, the installer releases the push rod 116, whereupon spring 110 axially displaces the latch pin 102 to its normal locking position, forcing the balls 104 outwardly until they engage the shoulder 34 to hold the latch pin 102 in its locked position. The two sets of indexing teeth 88, 90 respectively carried on the socket body 25 and the plug body 27 respectively, mesh and matingly engage each other to lock the plug 22 and socket 24 against relative rotation, causing the fixture to be held in a desired orientation selected by the installer.

If it is desired to rotate the fixture to a different position, the installer need only depress the push rod 116 and withdraw the plug 22 from the socket 24 a slight distance sufficient to disengage the teeth 88, 90 from each other, at which point the fixture may be rotated to a different position. With the fixture repositioned, the plug 22 is inserted back into its fully seated position against the socket 24 and the push rod 116 is released to lock the fixture in place. The full circle configuration of the connector rings 78 and the recesses 26 allows the fixture to be fixed in virtually any rotational position. However, it should be noted here that the connector rings 78 in the plug 22 and the mating recesses 26 in the socket 24, could be configured to extend less than a full 360 degrees, for example 180 degrees, in which case the fixture will only be rotatable to positions with the range permitted by the circumferential extent of the connector rings and corresponding recesses.

With the fixture installed as described above using the device 20, the supplied electrical power flows from the supply wiring to the contact terminals 48a–48d, and thence through the contacts 56 to the connector rings 78a–78d. From the connector rings 78a–78d, electrical power flows to the terminal blocks 84, and then to the fixture. In the illustrated embodiment, 4 connections are shown: a ground, a neutral and 2 lines, however, it is to be understood that fewer or a greater number of connections can be made, depending on the requirements of a given application. Advantageously, in the illustrated embodiment, connector ring 78d carries the ground connection. Because connector ring 78d possess a greater depth or height than the other connector rings, the ground connection is made before the other connections are established, thus assuring that any unintended short circuit electrical current present in the device 20 is safely carried to ground before the other "hot" connections are made.

What is claimed is:

1. A device for connecting an electrical fixture with electrical power supply wiring, and for mounting the fixture on a support, comprising:
   a socket including a socket body having at least one internal cavity therein;
   an electrically conductive contact terminal disposed within the cavity for establishing an electrical connection between the electrical power supply wiring and the socket, the contact terminal having a portion thereof captured between internal surfaces of the socket body to hold the contact terminal in a fixed position without the need for fasteners;
   a plug rigidly fixed to the fixture and insertable into the socket, the plug having at least one male connector electrically connected to the fixture and engageable with the contact terminal within the socket to establish a circuit between the electrical fixture and the electrical power wiring; and,
   a releasable latch carried on the combination of the plug and the socket for releasably mounting the fixture on the support, the releasable latch including a pin centrally positioned through the plug and socket.

2. The device of claim 1, wherein the socket includes a cover on the socket body overlying the cavity and engaging the contact terminal portion.

3. The device of claim 1, wherein the socket body includes a ledge within the cavity, and medial portions of the contact terminal are supported by the ledge.

4. The device of claim 1, including a spring member seated within the cavity for biasing the contact terminal toward the male connector to assure positive electrical contact with the male connector.

5. The device of claim 1, wherein the contact terminal includes a flexible leg engageable with and displaceable by the male connector.

6. The device of claim 1, wherein the contact terminal includes an upper extremity provided with a pair of closely spaced legs defining a slot within which an end of the electrical power supply wiring may be inserted and frictionally captured.

7. The device of claim 1, wherein the contact terminal includes an upper extremity provided with a pair of closely spaced legs defining a first and second, angularly offset slots within either of which an end of the electrical power supply wiring may be inserted and frictionally captured.

8. The device of claim 7, wherein the socket includes first and second openings therein through either of which the supply wiring may be passed for connection to the contact terminal.

9. The device of claim 1, wherein the contact terminal includes a pair of spaced apart, lateral walls engaging internal surface areas of the socket body within the cavity, the lateral walls functioning to restrain the contact terminal against lateral movement within the cavity.

10. The device of claim 1, including:
a plurality of spaced apart cavities in the socket body,
a plurality of contact terminals respectively associated with and fixed within the cavities without the need for fasteners, and,
a plurality of male connectors on the plug for respectively engaging and making electrical contact with the contact terminals.

11. A device for connecting an electrical fixture with electrical power supply wiring, and for mounting the fixture on a support, comprising:
a socket including a socket body having at least one internal cavity therein;
an electrically conductive contact terminal disposed within the cavity for establishing an electrical connection between the electrical power supply wiring and the socket, the contact terminal having a portion thereof captured between internal surfaces of the socket body to hold the contact terminal in a fixed position without the need for fasteners;
a plug rigidly fixed to the fixture and insertable into the socket, the plug having at least one male connector electrically connected to the fixture and engageable with the contact terminal within the socket to establish a circuit between the electrical fixture and the electrical power wiring;
a spring member seated within the cavity for biasing the contact terminal toward the male connector to assure positive electrical contact with the male connector and,
a releasable latch carried on the combination of the plug and the socket for releasably mounting the fixture on the support,
wherein the socket includes a cover on the socket body overlying the cavity, and the spring is a compression spring captured between one end of the contact terminal and the cover.

12. A device for connecting an electrical fixture with electrical power supply wiring, and for mounting the fixture on a support, comprising:
a socket including a socket body having a plurality of separated concentric circular internal cavities therein;
a plurality of electrically conductive contact terminals respectively disposed within the cavities for establishing electrical connections between the power supply wiring and the socket, the contact terminals each having a flexible contact portion;
a plug rigidly fixed to the fixture and insertable into the socket, the plug having a plurality of male connectors electrically connected to the fixture and respectively engageable with the contact terminals within the socket to establish a circuit between the electrical fixture and the electrical power supply wiring;
a plurality of spring members respectively mounted within the socket body cavities for biasing the flexible contact portions into engagement with the corresponding male connectors, and,
a releasable latch carried on the combination of the plug and the socket for releasably mounting the fixture on the support, the releasable latch including a pin centrally positioned through the plug and socket.

13. The device of claim 12, wherein each of the spring members is a compression spring.

14. The device of claim 13, wherein:
the socket includes a cover secured to the socket body and overlying the cavities, and each of the compression springs is trapped between the cover and a corresponding one of the flexible contact portions.

15. The device of claim 14, wherein each of the flexible contact portions includes a spring retainer on an extremity thereof for retaining one end of the compression spring.

16. The device of claim 15, wherein the cover includes a plurality of spring retaining elements formed on the inside thereof for retaining the other end of the compression springs.

17. The device of claim 15, wherein the spring retainer passes through the flexible contact portion and includes a contact member engageable with a corresponding one of the male connectors.

18. The device of claim 12, wherein each of the contact terminals having a portion thereof captured between internal surfaces of the socket body to hold the contact terminal in a fixed position without the need for fasteners.

19. The device of claim 12, wherein the socket body includes a ledge within each of the cavities, and medial portions of each of the corresponding contact terminals are supported by the ledge.

20. A device for connecting an electrical fixture with electrical power suppy wiring, and for mounting the fixture on a support, comprising:
a socket including a socket body having at least one internal cavity therein, and having first and second ends connected by a side wall;
an electrically conductive contact terminal disposed within the cavity for establishing an electrical connection between the power supply wiring and the socket;
a plug rigidly fixed to the fixture and insertable into second end of the socket, the plug having at least one male connector electrically connected to the fixture and engageable with the contact terminal within the socket to establish a circuit between the electrical fixture and the electrical power supply wiring;
at least one access opening in the first end of the socket communicating with the cavity, the access opening allowing the power supply wiring to be inserted threrethrouh into the cavity and connected with the contact terminal;
at least a second access opening in the sidewall of the socket body for allowing the power supply wiring to be inserted threrethrough into the cavity and connected with the contact terminal; and
a releasable latch carried on the combination of the plug and the socket for releasably mounting the fixture on the support.

21. The device of claim 20, wherein the contact terminal includes at least a first slot therein facing the first access opening for receiving and gripping the end of the power supply wiring.

22. The device of claim 21, wherein the contact terminal includes a second slot therein facing the second access opening for receiving and gripping the end of the power supply wiring.

23. The device of claim 20, wherein the socket includes a cover on the first end of the socket body overlying the cavity, and the first access opening is formed in the cover.

24. The device of claim 22, wherein the contact terminal is of unitary construction and includes a bifurcated end defining the first and second slots.

25. A device for connecting an electrical fixture with electrical power supply wiring, and for mounting the fixture on a support, comprising:
a socket;

an electrically conductive contact terminal disposed within the socket for establishing an electrical connection between the power supply wiring and the socket, the contact terminal having first and second angularly offset slots therein for receiving and gripping an end of the power supply wiring, the first and second slots providing choices for inserting the power supply wiring into the socket from either of two different locations on the socket;

a plug rigidly fixed to the fixture and insertable into the socket, the plug having at least one male connector electrically connected to the fixture and engageable with the contact terminal within the socket to establish a circuit between the electrical fixture and the electrical power supply wiring; and, a releasable latch carried on the combination of the plug and the socket for releasably mounting the fixture on the support.

26. The device of claim 25 wherein the socket includes at least one cavity therein and the contact terminal is disposed within the cavity.

27. The device of claim 26 wherein the socket includes a ledge within the cavity, and medial portions of the contact terminal are supported by the ledge.

28. The device of claim 26 including a spring member seated within the cavity for biasing the contact terminal toward the male connector to assure positive electrical contact with the male connector.

29. The device of claim 25 wherein the socket includes:
an end wall,
a side wall, and
first and second wire access openings respectively in the end wall and the side wall, the first and second wire access openings being aligned with the first and second slots respectively, and allowing an end of the power supply wiring to passed therethrough and inserted to the corresponding slot.

30. Apparatus for providing an electrical fixture connection on a flat surface such as a wall or ceiling, comprising:
a socket having a cylindrically shaped body and including a plurality of separated concentric circular internal cavities therein, the socket being recessed into the surface; and
a cover for covering the socket when a fixture is not installed on the socket, the cover including a ring shaped portion which may be sleeved over the cylindrical outside wall of the socket and in tight frictional engagement therewith so as to removably mount the cover on the socket, the cover extending laterally from the socket and visually covering the socket from view.

31. The apparatus of claim 30 wherein the cover includes a raised peripheral edge on one side thereof engaging the flat surface.

32. The apparatus of claim 30 wherein the cover is essentially flat.

33. The apparatus of claim 30 wherein the cover is of one, unitary construction.

34. A device for connecting an electrical fixture with electrical power supply wiring, and for mounting the fixture on a flat wall or ceiling, comprising:

a cylindrical socket having first and second ends connected by a cylindrical sidewall;
electrically conductive contact terminals within the socket for establishing an electrical connection between the power supply wiring and the socket;
a plug rigidly fixed to the fixture and insertable into the socket, the plug having male connectors electrically connected to the fixture and engageable with the contact terminals within the socket to establish a circuit between the electrical fixture and the electrical supply wiring;
a releasable latch carried on the combination of the plug and the socket for releasably mounting the fixture on the support, the releasable latch including a centrally positioned through the plug and socket; and,
an assembly for mounting the socket on wall or ceiling, including a flat plate secured to the first side of the socket, and a fastener passing through the plate for fastening the socket to the wall or ceiling, the plate being essentially completely concealed behind the socket and hidden from view when the socket is mounted on the wall or ceiling.

35. The device of claim 34 wherein the plate is secured to the first side of the socket by screws.

36. A device for connecting an electrical fixture with electrical power supply wiring, and for mounting the fixture on a support, comprising:
a socket connected with the power supply wiring;
a plug rigidly fixed to the fixture and insertable into the socket, the plug having a male connector for establishing an electrical connection between the fixture and the socket;
a releasable latch centrally located on the combination of the plug and the socket for releasably mounting the fixture on the support, the latch including a central push rod for latching and releasing the latch; and,
an actuator assembly for controlling the operation of the push rod from location laterally spaced from the central axis of the push rod.

37. The device of claim 36 wherein the actuator assembly includes:
an extension lever secured to and extending laterally from the push rod, and
a mounting assembly for mounting extension the lever on the combination of the latch and the plug.

38. The device of claim 37 wherein the mounting assembly includes:
a laterally extending support member carried on the combination of the latch and the plug,
a spacer for spacing the extension lever from the support member, and,
an extension rod secured to and extending outwardly from one end of the extension lever,
wherein displacement of the extension rod moves the extension lever to shift the push rod between latching and released positions.

39. The device of claim 38 wherein the extension lever is flexible about its other end.

* * * * *